(12) United States Patent
Sakamoto

(10) Patent No.: US 9,978,342 B2
(45) Date of Patent: May 22, 2018

(54) IMAGE PROCESSING METHOD CONTROLLING IMAGE DISPLAY BASED ON GAZE POINT AND RECORDING MEDIUM THEREFOR

(71) Applicant: Koei Tecmo Games Co., Ltd., Yokohama (JP)

(72) Inventor: Ryota Sakamoto, Yokohama (JP)

(73) Assignee: KOEI TECMO GAMES CO., LTD., Yokohama (JP)

( * ) Notice: Subject to any disclaimer, the term of this patent is extended or adjusted under 35 U.S.C. 154(b) by 0 days. days.

(21) Appl. No.: 15/135,639

(22) Filed: Apr. 22, 2016

(65) Prior Publication Data

US 2016/0314562 A1 Oct. 27, 2016

(30) Foreign Application Priority Data

Apr. 24, 2015 (JP) ................. 2015-089871

(51) Int. Cl.
| | |
|---|---|
| G09G 5/36 | (2006.01) |
| G06F 3/01 | (2006.01) |
| G06T 17/20 | (2006.01) |
| G06T 15/80 | (2011.01) |
| G06T 3/00 | (2006.01) |
| G06F 1/16 | (2006.01) |
| G06T 15/02 | (2011.01) |

(Continued)

(52) U.S. Cl.
CPC ............ *G09G 5/363* (2013.01); *G06F 1/163* (2013.01); *G06F 3/011* (2013.01); *G06F 3/013* (2013.01); *G06F 3/147* (2013.01); *G06T 3/00* (2013.01); *G06T 15/02* (2013.01); *G06T 15/80* (2013.01); *G06T 17/20* (2013.01); *G09G 5/391* (2013.01); *G06T 2210/36* (2013.01); *G09G 2320/0613* (2013.01); *G09G 2320/08* (2013.01); *G09G 2340/0407* (2013.01); *G09G 2340/12* (2013.01); *G09G 2340/14* (2013.01); *G09G 2354/00* (2013.01); *G09G 2370/16* (2013.01)

(58) Field of Classification Search
None
See application file for complete search history.

(56) References Cited

U.S. PATENT DOCUMENTS 5,894,308 A * 4/1999 Isaacs ................. G06T 17/20
345/420
2009/0309811 A1 12/2009 Hinton
(Continued)

FOREIGN PATENT DOCUMENTS

JP 2009-510540 3/2009

OTHER PUBLICATIONS

Alnajar, Fares, et al. "Calibration-free gaze estimation using human gaze patterns." Proceedings of the IEEE International Conference on Computer Vision. 2013. (Year: 2013).*

*Primary Examiner* — Vu Nguyen
(74) *Attorney, Agent, or Firm* — Mori & Ward, LLP

(57) ABSTRACT

An information processing device communicably connected to a head mounted display including a display device displaying an image and a sight line detector detecting a user's line of sight is caused to function as a drawing control part. The drawing control part controls drawing of the image such that the drawing is simplified in a peripheral region of a user's gaze point as compared to a vicinity region of the gaze point based on information on the user's line of sight detected by the sight line detector.

18 Claims, 11 Drawing Sheets

(51) Int. Cl.
   *G06F 3/147* (2006.01)
   *G09G 5/391* (2006.01)

(56) References Cited

U.S. PATENT DOCUMENTS

2012/0154277 A1* 6/2012 Bar-Zeev ............. G02B 27/017
   345/158
2014/0071163 A1* 3/2014 Kinnebrew .......... G03H 1/2249
   345/633

* cited by examiner

[FIG. 1]
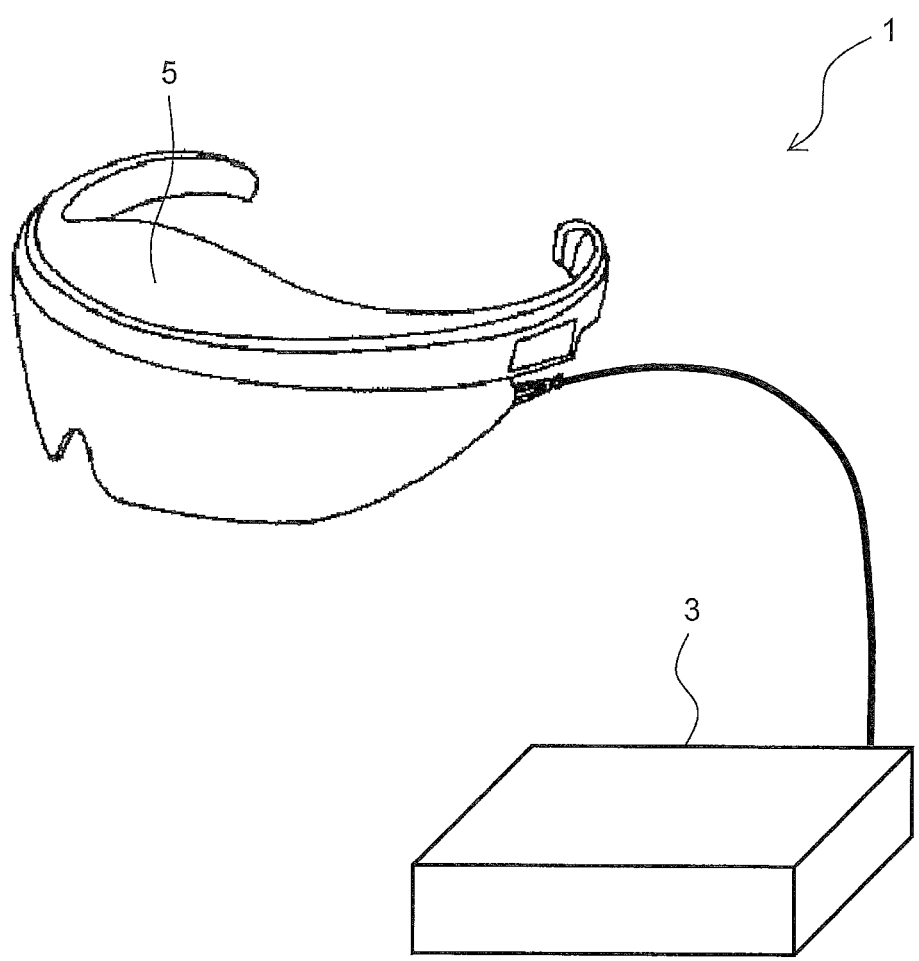

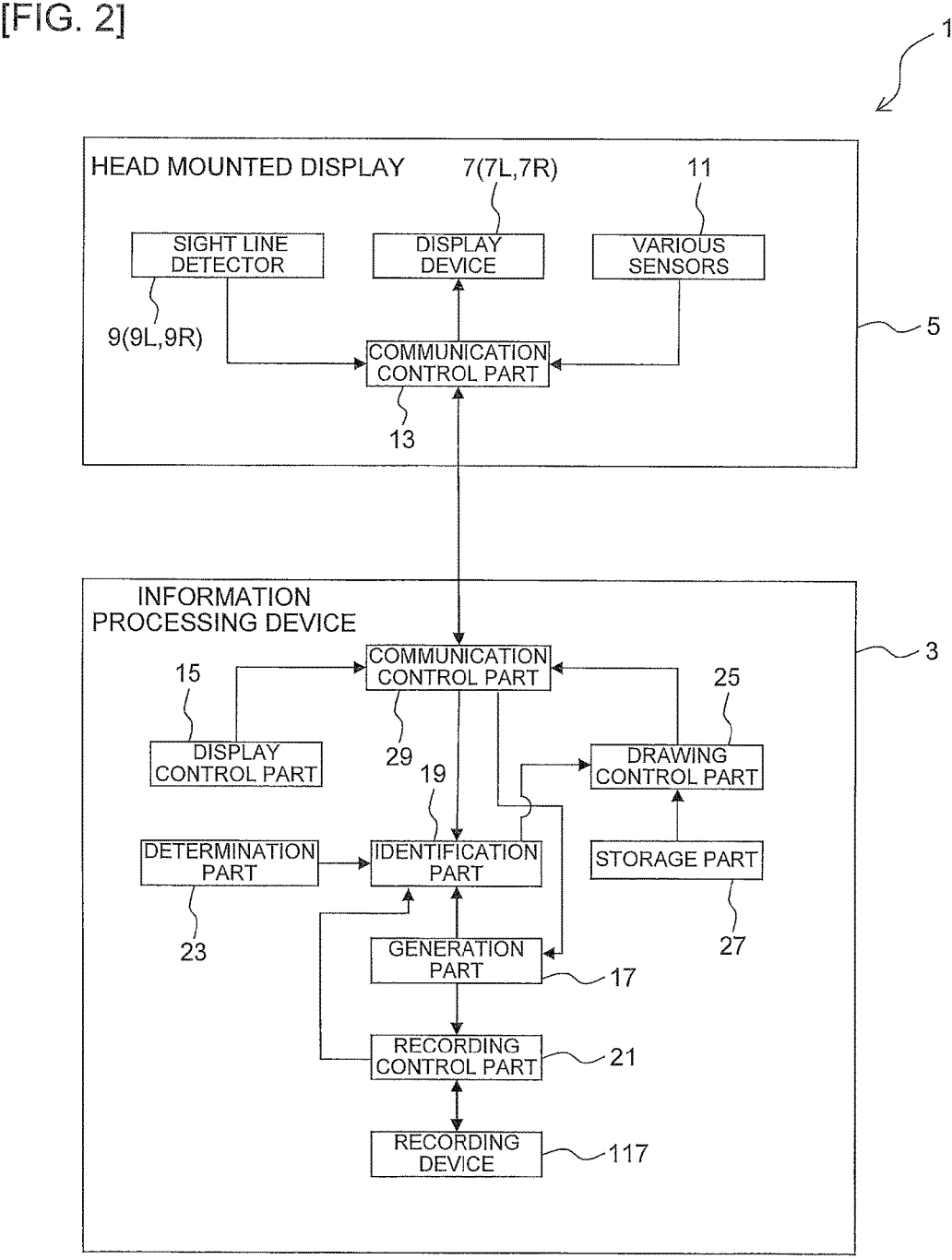

[FIG. 3]
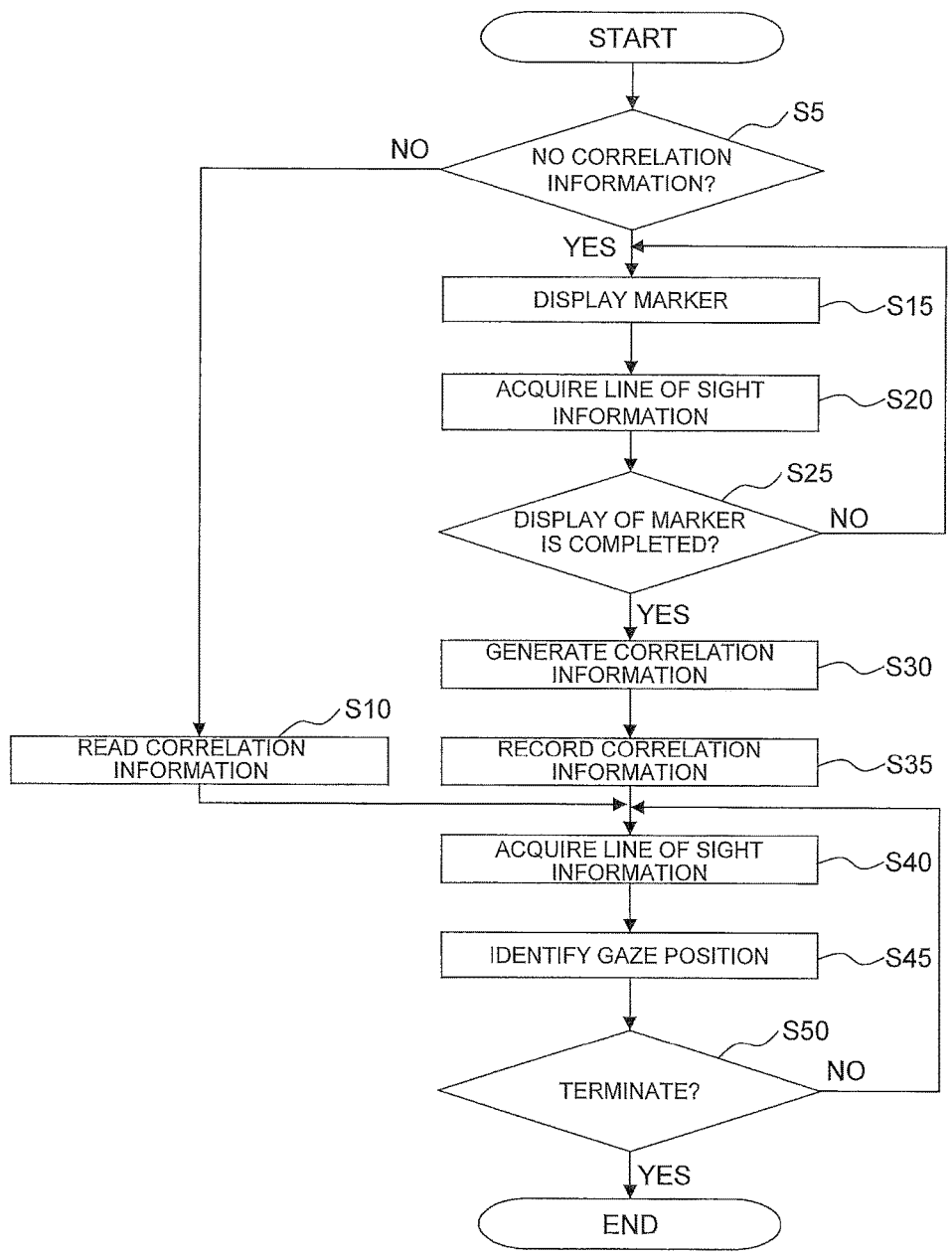

[FIG. 4]
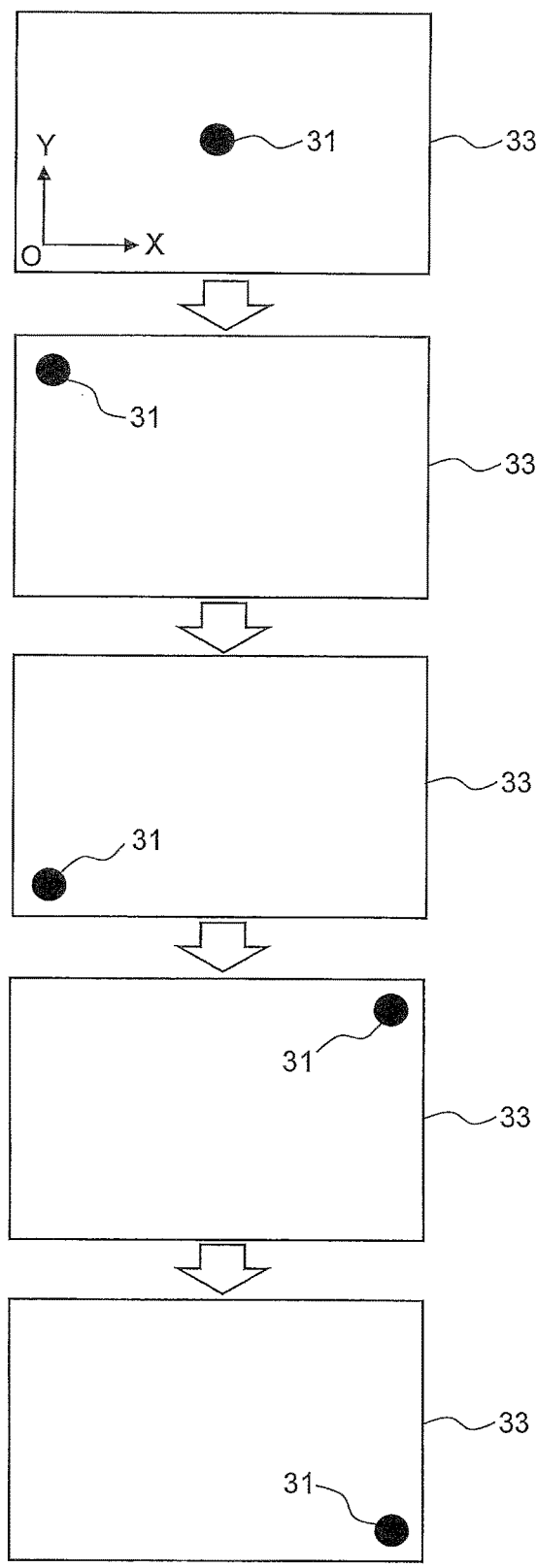

[FIG. 5]
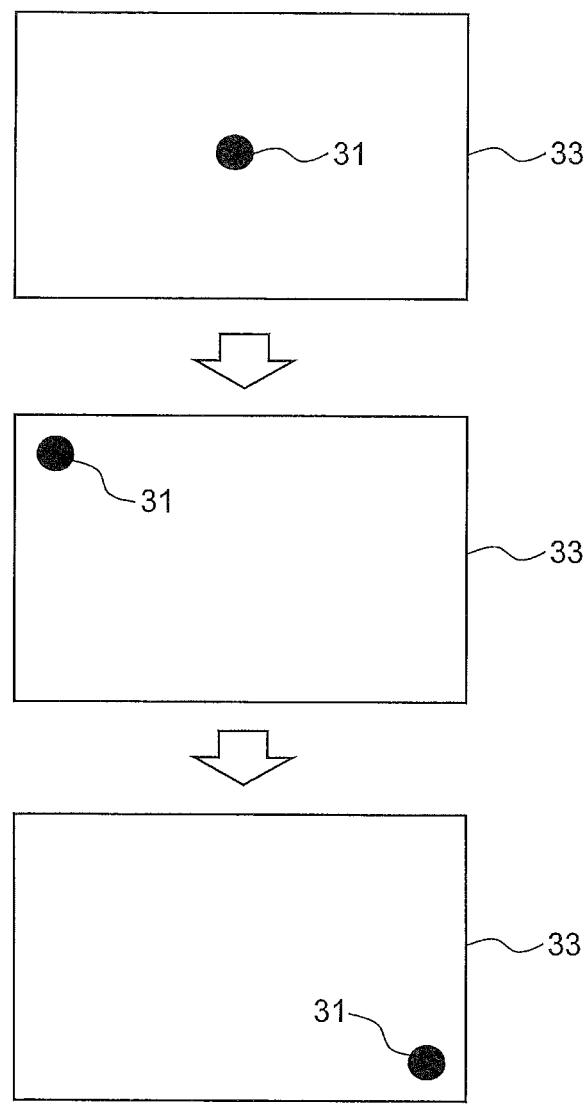

[FIG. 6]
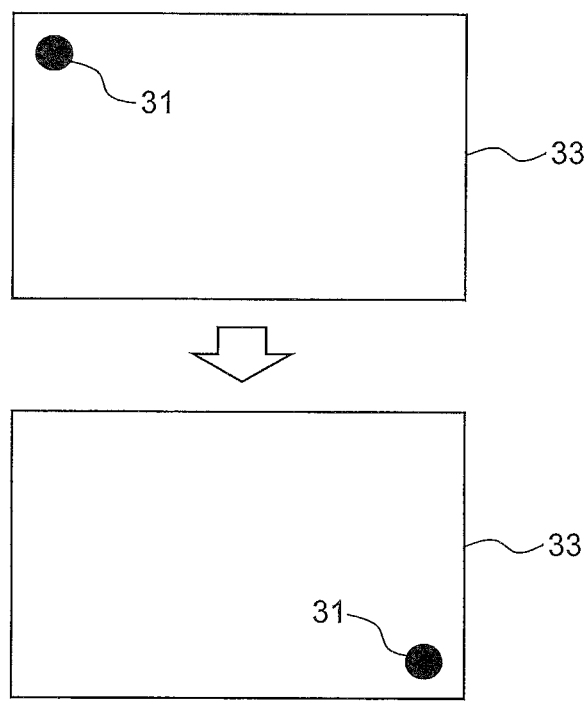
[FIG. 7]
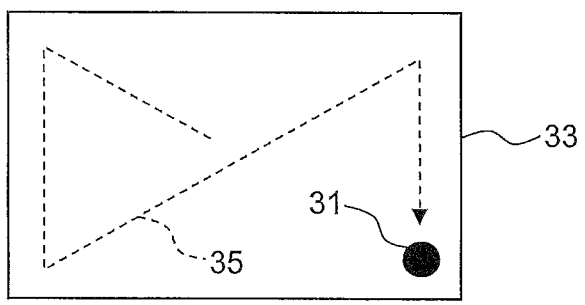

[FIG. 8]
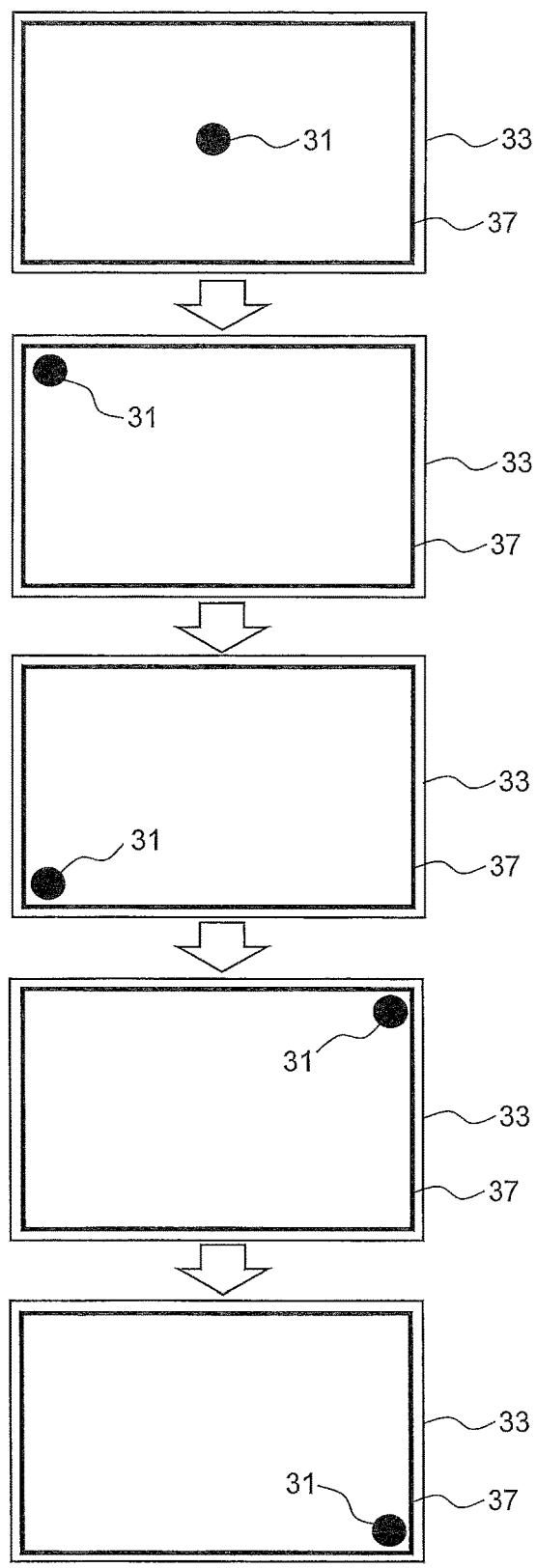

[FIG. 9]
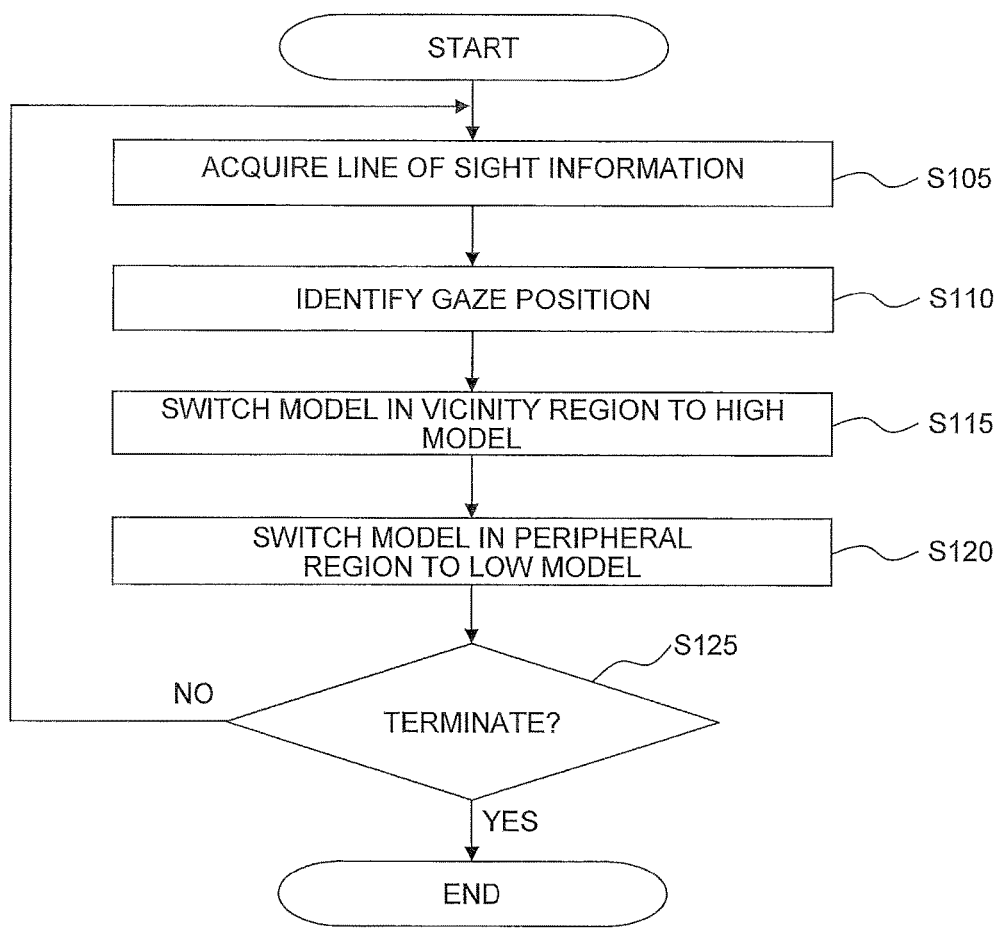

[FIG. 10]
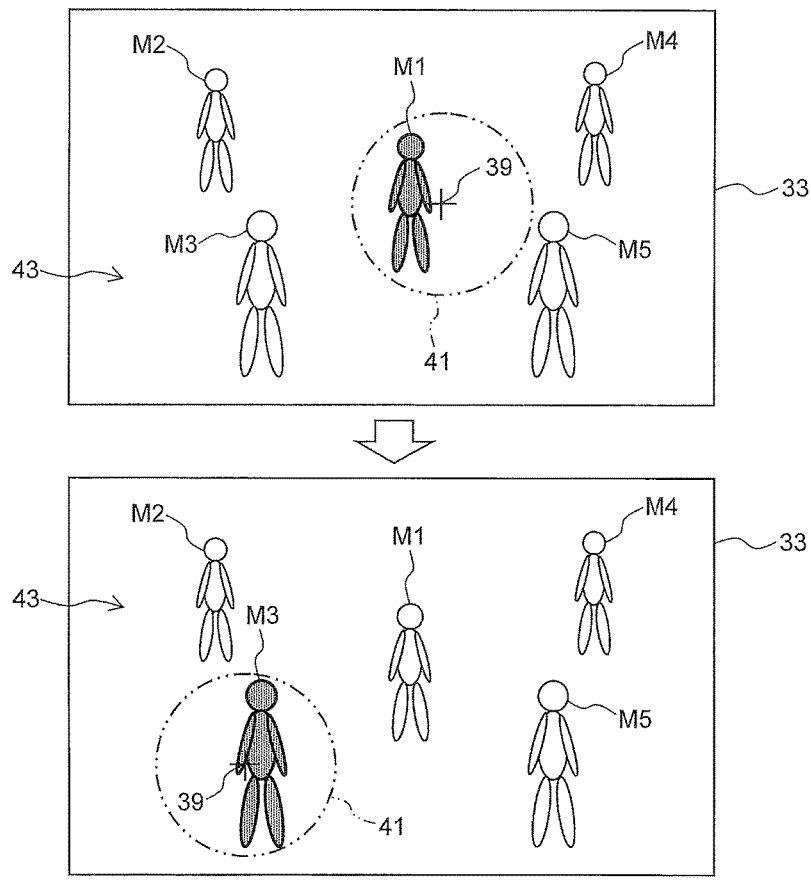
[FIG. 11]
|  | MODEL M1 | ... | MODEL M5 |
|---|---|---|---|
| HIGH MODEL | POLYGON COUNT: LARGE<br>TEXTURE RESOLUTION: HIGH<br>SHADER EFFECT: LARGE | ... | POLYGON COUNT: LARGE<br>TEXTURE RESOLUTION: HIGH<br>SHADER EFFECT: LARGE |
| LOW MODEL | POLYGON COUNT: SMALL<br>TEXTURE RESOLUTION: LOW<br>SHADER EFFECT: SMALL | ... | POLYGON COUNT: SMALL<br>TEXTURE RESOLUTION: LOW<br>SHADER EFFECT: SMALL |

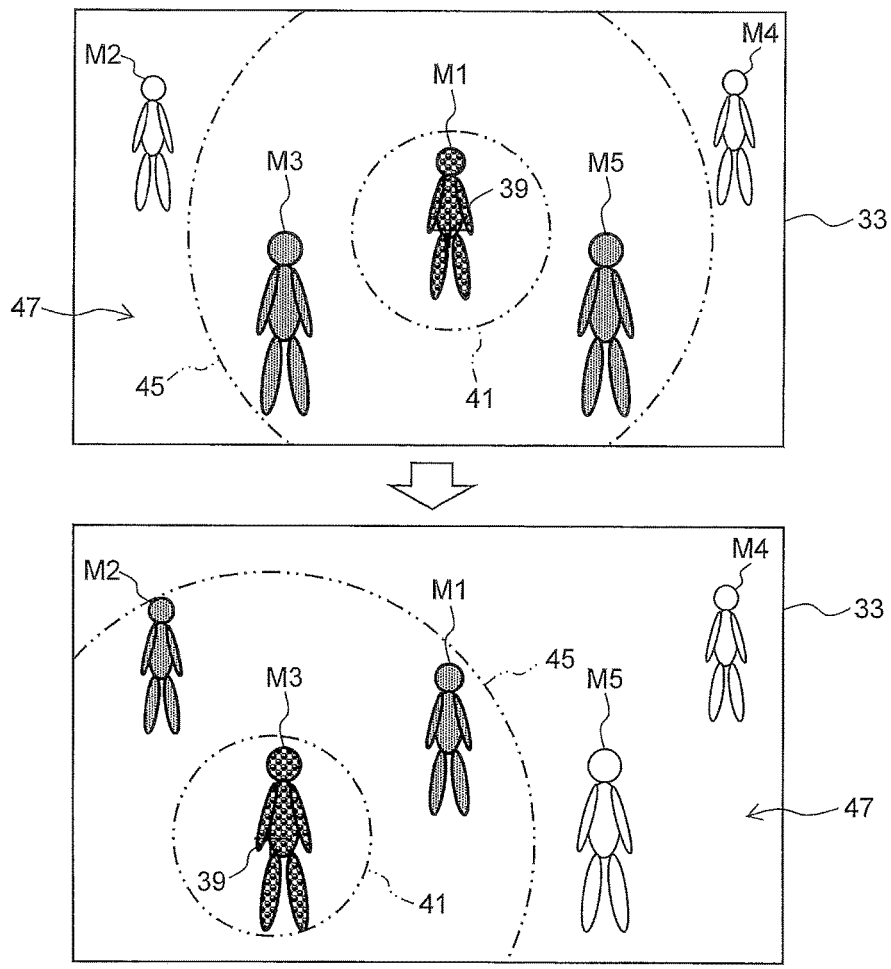

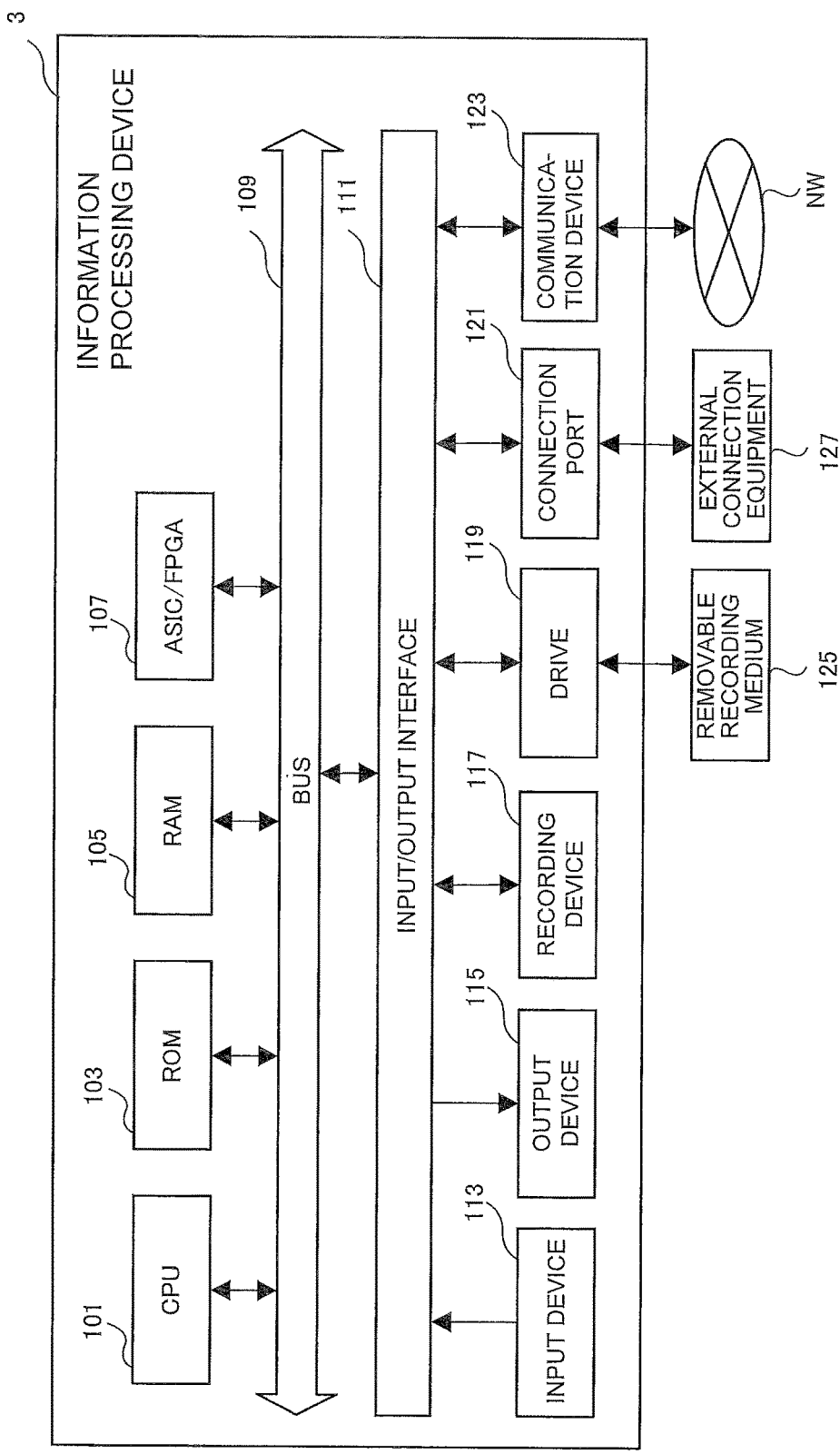
[FIG. 14]

IMAGE PROCESSING METHOD CONTROLLING IMAGE DISPLAY BASED ON GAZE POINT AND RECORDING MEDIUM THEREFOR

CROSS-REFERENCE TO RELATED APPLICATIONS

The present application is based upon and claims the benefit of priority to Japanese Patent Application No. 2015-089871, filed Apr. 24, 2015, the entire contents of which are incorporated herein by reference.

FIELD OF THE INVENTION

The present invention relates to an image processing method and a recording medium storing a program related to a head mounted display having a line of sight detection function.

BACKGROUND ART

As described in JP, T, 2009-510540, a head mounted display system is conventionally known that optically more compresses a peripheral region of an image as compared to a center region.

SUMMARY OF THE INVENTION

Problem to be Solved by the Invention

In a head mounted display, a user's line of sight is not always directed to the center of a display part and may be directed to a periphery of the display part. In this case, the user recognizes degradation in image quality due to a reduced resolution in a peripheral part in the prior art.

The present invention was conceived in view of such a problem and it is therefore an object of the present invention to provide an image processing method and a recording medium in which a program is recorded that is capable of improving image quality recognized by a user regardless of a gaze direction without increasing a processing load in a head mounted display having a line of sight detection function.

Means for Solving the Problem

To achieve the object, an image processing method of the present invention is characterized in that the image processing method is executed by an information processing device communicably connected to a head mounted display including a display device configured to display an image and a sight line detector configured to detect a user's line of sight. The image processing method includes controlling drawing of the image such that the drawing is simplified in a peripheral region of a gaze point of the user as compared to a vicinity region that is nearer to the gaze point than the peripheral region, based on information of the user's line of sight detected by the sight line detector.

To achieve the object, a program recorded in a recording medium of the present invention is characterized in that an information processing device communicably connected to a head mounted display including a display device configured to display an image and a sight line detector configured to detect a user's line of sight is caused to function as a drawing control part. The drawing control part controls drawing of the image such that the drawing is simplified in a peripheral region of a gaze point of the user as compared to a vicinity region that is nearer to the gaze point than the peripheral region, based on information of the user's line of sight detected by the sight line detector.

Since optical characteristics of the eye generally degrade as a distance from the center position of the retina increases, degradation in image quality may not be recognized by a user and therefore may be acceptable in a peripheral region at a predetermined distance from the gaze point.

The program recorded in the recording medium of the present invention causes the information processing device communicably connected to the head mounted display to function as the drawing control part. This drawing control part controls drawing of an image such that the drawing is simplified in the peripheral region of the user's gaze point as compared to the vicinity region of the gaze point based on the information on the user's line of sight detected by the sight line detector. Since the drawing is controlled in accordance with the direction of the user's line of sight, the simplified drawing in the peripheral region is hardly recognized by the user regardless of the direction of the line of sight. Because of the simplified drawing in the peripheral region, the vicinity region of the gaze point can accordingly be drawn with higher image quality without increasing a processing load. Therefore, the image quality recognized by the user can be improved regardless of the gaze direction.

Preferably, the image processing method of the present invention further includes storing a plurality of models drawn at different levels of image quality for each type of the model. The controlling drawing of the image includes switching the model located in the peripheral region to the model with lower image quality as compared to the model located in the vicinity region.

Preferably, the program recorded in the recording medium of the present invention further causes the information processing device to function as a storage part that stores a plurality of models drawn at different levels of image quality for each type of the model. The drawing control part switches the model located in the peripheral region to the model with lower image quality as compared to the model located in the vicinity region.

The program recorded in the recording medium of the present invention further causes the information processing device to function as the storage part. This storage part stores a plurality of models drawn at different levels of image quality for each type of the model. The drawing control part switches the model located in the peripheral region of the gaze point to the model with the lower image quality as compared to the model located in the vicinity region of the gaze point.

Since the drawing is controlled for each model, an increase in the processing load can be suppressed as compared to the case of controlling the drawing of the entire region including a background and, since the model tending to attract user's attention is subjected to the drawing control, the apparent image quality recognized by the user can effectively be improved.

In the image processing method of the present invention, preferably, the controlling drawing of the image includes switching the model located in the vicinity region to the model with highest image quality out of corresponding type of the models stored.

In the program recorded in the recording medium of the present invention, preferably, the drawing control part switches the model located in the vicinity region to the model with highest image quality out of corresponding type of the models stored in the storage part.

In the present invention, the drawing control part switches the model located in the vicinity region to the model with highest image quality out of the corresponding type of the models stored in the storage part. As a result, the image quality can be maximized in the easily recognized vicinity region while lowering the image quality of the peripheral region hardly recognized by the user and, therefore, processing performance can be optimized.

In the image processing method of the present invention, preferably, the storing a plurality of models includes storing a plurality of models having different levels of polygon count for each type of the model. The controlling drawing of the image includes switching the model located in the peripheral region to the model having smaller polygon count as compared to the model located in the vicinity region.

In the program recorded in the recording medium of the present invention, preferably, the storage part stores a plurality of models having different levels of polygon count for each type of the model. The drawing control part switches the model located in the peripheral region to the model having smaller polygon count as compared to the model located in the vicinity region.

In the present invention, the storage part stores a plurality of models having different levels of polygon count for each type of the model. The drawing control part switches the model located in the peripheral region to the model having smaller polygon count as compared to the model located in the vicinity region.

As a result, an image can be drawn with higher quality with a relatively larger polygon count in the easily recognized vicinity region while simplifying the drawing with a relatively smaller polygon count in the peripheral region hardly recognized by the user and, therefore, the image quality recognized by the user can further be improved regardless of the gaze direction.

In the image processing method of the present invention, preferably, the storing a plurality of models includes storing a plurality of models having different levels of texture resolution for each type of the model. The controlling drawing of the image includes switching the model located in the peripheral region to the model having lower texture resolution as compared to the model located in the vicinity region.

In the program recorded in the recording medium of the present invention, preferably, the storage part stores a plurality of models having different levels of texture resolution for each type of the model. The drawing control part switches the model located in the peripheral region to the model having lower texture resolution as compared to the model located in the vicinity region.

In the present invention, the storage part stores a plurality of models having different levels of texture resolution for each type of the model. The drawing control part switches the model located in the peripheral region to the model having lower texture resolution as compared to the model located in the vicinity region.

As a result, an image can be drawn with higher quality with a relatively higher texture resolution in the easily recognized vicinity region while simplifying the drawing with a relatively lower texture resolution in the peripheral region hardly recognized by the user and, therefore, the image quality recognized by the user can be improved regardless of the gaze direction.

In the image processing method of the present invention, preferably, the storing a plurality of models includes storing a plurality of models having different degrees of shader effect for each type of the model. The controlling drawing of the image includes switching the model located in the peripheral region to the model having smaller degree of shader effect as compared to the model located in the vicinity region.

In the program recorded in the recording medium of the present invention, preferably, the storage part stores a plurality of models having different degrees of shader effect for each type of the model. The drawing control part switches the model located in the peripheral region to the model having smaller degree of shader effect as compared to the model located in the vicinity region.

In the present invention, the storage part stores a plurality of models having different degrees of shader effect for each type of the model. The drawing control part switches the model located in the peripheral region to the model having smaller degree of shader effect as compared to the model located in the vicinity region.

As a result, an image can be drawn with higher quality at a relatively larger degree of shader effect in the easily recognized vicinity region while simplifying the drawing at a relatively smaller degree of shader effect in the peripheral region hardly recognized by the user and, therefore, the image quality recognized by the user can be improved regardless of the gaze direction.

Advantages of the Invention

The image processing method and the program recorded in the recording medium of the present invention enables a head mounted display having a line of sight detection function to improve the image quality recognized by a user regardless of a gaze direction without increasing a processing load.

BRIEF DESCRIPTION OF THE DRAWINGS

FIG. 1 is an explanatory view of an example of an overall configuration of a head mounted display system related to an embodiment.

FIG. 2 is a block diagram of an example of configurations of a head mounted display and an information processing device related to the embodiment.

FIG. 3 is a flowchart of an example of process procedures related to adjustment of line of sight detection performed by a CPU of the information processing device.

FIG. 4 is an explanatory view for explaining an example of a marker display form.

FIG. 5 is an explanatory view for explaining another example of the marker display form.

FIG. 6 is an explanatory view for explaining another example of the marker display form.

FIG. 7 is an explanatory view for explaining another example of the marker display form.

FIG. 8 is an explanatory view for explaining another example of the marker display form.

FIG. 9 is a flowchart of an example of process procedures related to drawing control based on a line of sight performed by the CPU of the information processing device.

FIG. 10 is an explanatory view for explaining an example of a form of the drawing control based on the line of sight.

FIG. 11 is an explanatory table for explaining an example of storage contents of a storage part.

FIG. 12 is an explanatory view for explaining another example of a form of the drawing control based on the line of sight.

FIG. 13 is an explanatory table for explaining another example of storage contents of the storage part.

FIG. 14 is a block diagram of an example of a hardware configuration of the information processing device.

DESCRIPTION OF THE EMBODIMENTS

An embodiment of the present invention will now be described with reference to the drawings.

<1. Overall Configuration of System>

An example of an overall configuration of a head mounted display system 1 related to this embodiment will first be described with reference to FIG. 1. As shown in FIG. 1, the head mounted display system 1 has an information processing device 3 and a head mounted display 5. The information processing device 3 and the head mounted display 5 are communicably connected. Although FIG. 1 shows the case of wired connection, wireless connection may be used.

The information processing device 3 is a so-called computer. Examples of the computer in this case include not only those manufactured and sold as computers such as server computers, desktop computers, notebook computers, and tablet computers, but also those manufactured and sold as telephones such as portable telephones, smartphones, and phablets, and those manufactured and sold as game machines or multimedia terminals such as portable game terminals, game consoles, and entertainment devices.

The head mounted display 5 is a display device that can be mounted on the head or face of a user. The head mounted display 5 displays images (including still images and moving images) generated by the information processing device 3. Although FIG. 1 shows a goggle type head mounted display as an example, the head mounted display is not limited to this shape. The head mounted display 5 may be of either a transmission type or a non-transmission type.

<2. General Configuration of Head Mounted Display>

An example of a general configuration of the head mounted display 5 will be described with reference to FIG. 2. As shown in FIG. 2, the head mounted display 5 has a display device 7 displaying an image, a sight line detector 9 detecting a line of sight of a user, and various sensors 11. The display device 7 includes, for example, a liquid crystal display or an organic EL display. The display device 7 has a left-eye display device 7L and a right-eye display device 7R and can display an independent image for each of the left and right eyes of the user to display a 3D image. The display device 7 may not necessarily have two display devices and may be a single display device common to the left and right eyes or may be a single display device corresponding to only one eye, for example.

The sight line detector 9 includes, for example, a visible light camera and a line of sight information calculation part not shown. An image of a user's eye takin by the visible light camera is sent to the line of sight information calculation part. Based on the image, the line of sight information calculation part defines, for example, the inner corner of the eye as a reference point and the iris (so-called colored portion of the eye) as a moving point to calculate user's line of sight information based on the position of the iris relative to the inner corner of the eye. The line of sight information is information indicative of the direction of the user's line of sight and is, for example, vector information of the line of sight. Although the line of sight information calculation part is implemented in the head mounted display 5 in the description of this embodiment, the line of sight information calculation part may be implemented in the information processing device 3. In the case that the line of sight information calculation part is implemented in the head mounted display 5, the line of sight information calculated by the line of sight information calculation part (in other words, detected by the sight line detector 9) is transmitted from the head mounted display 5 to the information processing device 3. In the case that the line of sight information calculation part is implemented in the information processing device 3, an image taken by the visible light camera is transmitted to the information processing device 3 and the line of sight information is calculated in the information processing device 3.

The sight line detector 9 has a sight line detector 9L for photographing the left eye and a sight line detector 9R for photographing the right eye and can independently detect the line of sight information of each of the left and right eyes of the user. The sight line detector 9 may not necessarily include two devices and the single sight line detector 9 may photograph only one eye.

The line of sight detection technique of this embodiment is not limited to the above technique and various other detection techniques are employable. For example, the sight line detector 9 may include an infrared LED and an infrared camera. In this case, the infrared camera photographs the eye irradiated by the infrared LED and, based on the photographed image, the line of sight information calculation part defines, for example, a position of reflection light on the cornea (corneal reflex) generated by the irradiation of the infrared LED as the reference point and the pupil as the moving point to calculate the user's line of sight information (line of sight vector) based on the position of the pupil relative to the position of the corneal reflex. Alternatively, the detection technique may include detecting a change in surface electromyography of the user's face or in weak myogenic potential (ocular potential) generated when the eyeball is moved.

In the case that a visible light camera is used as in this embodiment, costs can be reduced as compared to using the infrared camera; however, a problem of reduced detection accuracy occurs. Therefore, it is extremely effective to improve the detection accuracy through adjustment of the line of sight detection as described later.

The various sensors 11 include an acceleration sensor and a gyro sensor, for example. These sensors detect the movement and position of the user's head. Base on the detection results of the various sensors 11, the information processing device 3 changes the images displayed on the display device 7 in accordance with the movement and position of the user's head so as to achieve realistic virtual reality.

A communication control part 13 controls communications with the information processing device 3. For example, the communication control part 13 receives an image to be displayed on the display device 7 from the information processing device 3 and transmits the line of sight information detected by the sight line detector 9 and the detection information detected by the various sensors 11 to the information processing device 3. The communication control part 13 may be implemented by a program executed by a CPU not depicted mounted on the head mounted display 5 or may partially or entirely be implemented by an actual device such as an ASIC, an FPGA, or other electric circuits.

The configuration form of the head mounted display 5 is not limited to the above description. For example, although not described, the head mounted display 5 may be equipped with an earphone or a headphone.

<3. Functional Configuration of Information Processing Device>

An example of a functional configuration of the information processing device 3 will be described with reference to FIG. 2. It is noted that although the functional configuration of the information processing device 3 will be described in terms of a line of sight detection adjustment function and a drawing control function based on the line of sight, a functional configuration related to the other normal functions of the information processing device 3 (e.g., display and reproduction of contents and activation of a game) will not be described. The arrows shown in FIG. 2 indicate an example of signal flow and are not intended to limit the signal flow directions.

As shown in FIG. 2, the information processing device 3 has a display control part 15, a generation part 17, an identification part 19, a recording control part 21, a determination part 23, a drawing control part 25, a storage part 27, and a communication control part 29.

The display control part 15 displays a marker 31 (see FIGS. 4 to 8) guiding a user's line of sight on the display device 7 of the head mounted display 5. As described in detail later, the marker 31 has a plurality of display positions (at least two positions) each set at a predetermined position in a two-dimensional coordinate system in a visual field 33 (see FIGS. 4 to 8) of the display device 7. The display control part 15 displays the marker 31 at the predetermined position to guide the user's line of sight to the predetermined position and causes the user gaze at the position.

In this case, the display control part 15 displays the marker 31 such that the marker 31 stands still at preset positions in the visual field 33 of the display device 7, or such that the marker 31 moves through a preset route in the visual field 33, regardless of the movement and position of the user's head.

The generation part 17 generates correlation information between the user's line of sight information guided by the marker 31 and the display position of the marker 31. Specifically, when the user gazes at the marker 31 displayed on the display device 7, the line of sight information is detected by the sight line detector 9 and transmitted to the information processing device 3. The display positions of the marker 31 are set in advance as described above, and information of the display positions (e.g., coordinates in the two-dimensional coordinate system of the visual field 33) is recorded in, for example, a recording device 117 (see FIG. 14) of the information processing device 3. The generation part 17 acquires the information of the user's line of sight guided by the marker 31 and detected by the sight line detector 9 and reads the display position information of the marker 31 from the recording device 117 etc. The generation part 17 performs this operation for a plurality of display positions of the marker 31 to generate the correlation information between the line of sight information and the display positions.

The format of the correlation information is not particularly limited and may be, for example, a table correlating the coordinates of the visual field 33 with the line of sight information or may be, for example, an arithmetic expression for correcting the line of sight information to corresponding coordinates. In the case that the sight line detector 9 independently detects the line of sight information of each of the left and right eyes of the user, the format may be two tables correlating the line of sight information of one eye with the coordinates and the line of sight information of the other eye with the coordinates, or may be a plurality of arithmetic expressions for correcting the pieces of the line of sight information to corresponding coordinates. Alternatively, the pieces of the line of sight information of the left and right eyes may be integrated into a piece of the line of sight information by a predetermined arithmetic expression etc., before generating the correlation information. The generated correlation information is written and recorded by the recording control part 21 into the recording device 117 including a hard disk, for example.

The identification part 19 identifies a user's gaze position (also referred to as a gaze point) based on the line of sight information by using the correlation information. Specifically, after completion of the adjustment of the line of sight detection described above (from the display of the marker 31 to the recording of the correlation information), when the user gazes at a predetermined position in the visual field 33 of the display device 7 during, for example, display or reproduction of contents or activation of a game, the line of sight information in this case is detected by the sight line detector 9 and transmitted to the information processing device 3. The identification part 19 refers to the correlation information read from the recording device 117 to identify a position (coordinates) corresponding to the acquired line of sight information, i.e., a user's gaze position.

The recording control part 21 writes and reads various pieces of information into and from the recording device 117. For example, the recording control part 21 correlates the correlation information generated by the generation part 17 with identification information of a user corresponding to the correlation information and writes and records the correlation information along with the identification information for each user in the recording device 117.

The determination part 23 determines whether a user using the head mounted display 5 is a user having the recorded correlation information. Specifically, when using the head mounted display 5, a user inputs identification information (such as a login ID) by using an input device 113 (see FIG. 14) etc. of the information processing device 3, and the determination part 23 determines whether the correlation information corresponding to the input identification information is recorded in the recording device 117. In the case that the correlation information corresponding to the input identification information is recorded in the recording device 117, the determination part 23 determines that the user is a user having the recorded correlation information. In this case, the recording control part 21 reads the corresponding correlation information from the recording device 117 and the identification part 19 uses the read correlation information to identify the gaze position of the user based on the line of sight information.

Based on the user's line of sight information detected by the sight line detector 9, the drawing control part 25 controls drawing of an image displayed on the display device 7 such that the drawing is simplified in a peripheral region of a user's gaze point 39 (see FIGS. 10 and 12) as compared to a vicinity region of the gaze point 39. The vicinity region is nearer to the gaze point 39 than the peripheral region. Specifically, the storage part 27 stores M (see FIGS. 11 and 13) a plurality of models drawn at different levels of image quality for each type of the model, and the drawing control part 25 switches the model M located in the peripheral region of the gaze point 39 to a model with lower image quality as compared to the model M located in the vicinity region in the visual field 33 of the display device 7. The drawing control part 25 switches the model M located in the vicinity region of the gaze point 39 to the model with highest image quality out of the corresponding models M stored in the storage part 27.

The models M are person models, character models, background models, etc., displayed in the visual field 33 by the display device 7 during execution of a game, for example, and may include icons displayed on a menu screen etc. during display or reproduction of contents, for example.

Although the drawing control part 25 switches the models M to control the drawing for each model in the description of this embodiment, the drawing may be controlled also in an image portion other than the models, such as a background image, a motion image, and an effect image, for example.

As described in detail later, the storage part 27 stores for each of the models M a plurality of models drawn at different levels of image quality as described above. The models drawn at different levels of image quality are, for example, models having different levels of polygon count, models having different levels of texture resolution, and models having different degrees of shader effect. These factors related to the image quality may be changed in stages independently of each other in the drawing, or two or more of these factors may compositely be changed in stages in the drawing. The factors related to the image quality are not limited to the above factors and may include other factors.

The communication control part 29 controls communications with the head mounted display 5. A mode of communications between the control parts 13, 29 is not particularly limited as long as information can be transmitted and received. As described, either wired or wireless communication may be employed.

The processes in the processing parts described above are not limited to the example in terms of assignment of these processes and may be executed by the fewer number of the processing parts (e.g., one processing part) or may be executed by more finely divided processing parts. The functions of the processing parts described above are implemented by a program executed by a CPU 101 described later (see FIG. 14) or may partially or entirely be implemented by an actual device such as an ASIC, an FPGA, or other electric circuits, for example.

<4. Process Procedures Relate to Adjustment of Line-of-Sight Detection>

An example of process procedures related to the adjustment of the line of sight detection performed by the CPU 101 of the information processing device 3 will be described with reference to FIG. 3.

At step S5, the information processing device 3 uses the determination part 2 to determine whether the correlation information of a user using the head mounted display 5 is recorded in the recording device 117. In particular, the determination part 2 uses the identification information (such as a login ID) input by the user through the input device 113 etc., to determine whether the corresponding correlation information is recorded in the recording device 117. In the case that the correlation information is recorded in the recording device 117 (step S5:NO), the information processing device 3 goes to step S10.

At step S10, the information processing device 3 uses the recording control part 21 to read the correlation information corresponding to the input identification information from the recording device 117. Subsequently, the information processing device 3 goes to step S40.

On the other hand, in the case that the correlation information is not recorded in the recording device 117 at step S5 (step S5:YES), the information processing device 3 goes to step S15.

At step S15, the information processing device 3 uses the display control part 15 to display the marker 31 guiding the user's line of sight on the display device 7 of the head mounted display 5. A display form of the marker 31 in this case will be described later (FIGS. 4 to 8).

At step S20, the information processing device 3 uses the generation part 17 to acquire the information of the user's line of sight guided by the marker 31 and detected by the sight line detector 9.

At step S25, the information processing device 3 determines whether the display of the marker 31 is completed. As described in detail later, the marker 31 is statically displayed at a plurality of predetermined locations in a predetermined order in the visual field 33 of the display device 7, or the marker 31 moves continuously through a route along the plurality of the locations. In the case that this display sequence of the marker 31 is not completed to the end (step S25:NO), the information processing device 3 returns to step S15 to repeat the display of the marker 31 and the acquisition of the line of sight information. In the case that the display of the marker 31 is completed (step S25:YES), the information processing device 3 goes to step S30.

At step S30, the information processing device 3 uses the generation part 17 to generate the correlation information. In particular, the generation part 17 reads from the recording device 117 etc. the display position information of the marker 31 corresponding to each of the pieces of line of sight information acquired at step S20 and generates the correlation information between the line of sight information and the display positions. The correlation information is, for example, a correlation table or a correction arithmetic expression as described above.

At step S35, the information processing device 3 writes and records the correlation information generated by the recording control part 21 at step S30 into the recording device 117.

With the process procedures from step S15 to step S35, the adjustment of the line of sight detection is completed. The processes from step S40 are executed during, for example, the display or reproduction of contents or the activation of a game by the information processing device 3 after completion of the adjustment of the line of sight detection.

At step S40, the information processing device 3 acquires the user's line of sight information detected by the sight line detector 9.

At step S45, the information processing device 3 uses the identification part 19 to refer to the correlation information read from the recording device 117 so as to identify the user's gaze position corresponding to the line of sight information acquired at step S40. This identified gaze position is utilized for various applications using line of sight input (e.g., presentation of a game).

At step S50, the information processing device 3 determines whether the user inputs a termination instruction (e.g., a termination instruction for the display or reproduction of contents or a termination instruction for a game) by using the input device 113 etc. In the case that the termination instruction is not input (step S50:NO), the information processing device 3 returns to step S40 to repeat the acquisition of the line of sight information, the identification of the gaze position, etc. In the case that the termination instruction is input (step S50:YES), this flow is terminated.

The process procedures described above are an example and may at least partially be deleted or modified, or other procedures may be added. For example, the generated correlation information may not be recorded and reused, and the line of sight detection may be adjusted each time the head mounted display 5 is used. This eliminates the need for steps S5 and S10. For example, the information processing device 3 may only temporarily retain the correlation information generated at step S30 in, for example, a RAM 105

(see FIG. 14), so as to use the correlation information without recording into the recording device 117. This eliminates the need for step S35.

<5. Display Form of Marker>

An example of the display form of the marker 31 will be described with reference to FIGS. 4 to 8.

(5-1. Five-Position Static Display at Center and Four Corners)

As shown in FIG. 4, the marker 31 is displayed in the user's visual field 33 in the display device 7. Although the shape of the visual field 33 is substantially rectangular in examples shown in FIG. 4 etc., this is not a limitation and the shape may be an ellipse or a polygonal shape other than a rectangle, for example. As described above, the marker 31 has a plurality of display positions set in advance at predetermined coordinate positions in a two-dimensional coordinate system (an X-Y coordinate system shown in FIG. 4) in the visual field 33.

In the example shown in FIG. 4, the display positions of the marker 31 are set at five positions, one at a center position and the others close to four corners of the visual field 33. The center position is a position of an intersection of two diagonal lines of a rectangle, for example. When it is assumed that the X-axis positive side, the X-axis negative side, the Y-axis positive side, and the Y-axis negative side are on the right, left, upper, and lower sides, respectively, in the X-Y coordinate system shown in FIG. 4 for convenience of description, the marker 31 in the example shown in FIG. 4 is sequentially statically displayed in the order of the center position, a position close to the upper left corner, a position close to the lower left corner, a position close to the upper right corner, and a position close to the lower right corner. This order of display of the marker 31 is not a limitation and may be changed such that, for example, the marker 31 is displayed at the center position at the end or in the upper left corner at the start.

The marker 31 is statically displayed at each position for a constant time (e.g., about 1 second). While the user gazes at the marker 31 for the constant time, the sight line detector 9 detects the line of sight information. In this situation, for example, the sight line detector 9 may detect the line of sight information a plurality of times within the constant time and obtain an average etc. as the line of sight information corresponding to the display position of the marker 31. Alternatively, for example, the line of sight information detected at certain timing within the constant time may be defined as the line of sight information corresponding to the display position of the marker 31.

The marker 31 is drawn as a graphic of a black circle in this example. The marker 31 is not limited to this drawing form and may be, for example, a graphic of another shape such as a polygonal shape and an ellipse, a character, a sign, or an icon of a mascot etc. Additionally, the marker 31 may have a pattern, color, etc. Therefore, the marker 31 may be any marker easy for the user to gaze at and the drawing form thereof is not particularly limited.

The display control part 15 displays the marker 31 such that the marker 31 stands still at the five positions, one at the center position and the others close to the four corners of the visual field 33, regardless of the movement and position of the user's head. As a result, even in the case that the user moves the head during adjustment of the line of sight detection, the marker 31 is displayed at the set positions without being affected by the movement and the line of sight detection can properly be adjusted.

(5-2. Three-Position Static Display at Center and Two Corners)

In the example shown in FIG. 5, the display positions of the marker 31 are set at three positions, one at the center position and the others close to two corners on one diagonal line of the visual field 33. In this example, the marker 31 is sequentially statically displayed in the order of the center position, the position close to the upper left corner, and the position close to the lower right corner. Instead of the two corners described above, the marker 31 may be displayed in two corners on the other diagonal line, i.e., the positions close to the upper right corner and the lower left corner. This order of display of the marker 31 is not a limitation and may be changed.

By acquiring the line of sight information in the two corners on one diagonal line of the visual field 33, the line of sight information in the two corners on the other diagonal line can be estimated. Therefore, the display positions of the marker 31 can be reduced to shorten the adjustment time in this example by displaying the marker 31 at the center position and two corners on a diagonal line out of the four corners of the visual field 33.

(5-3. Two-Position Static Display at Two Corners)

In the example shown in FIG. 6, the display positions of the marker 31 are set only at two positions close to two corners on one diagonal line of the visual field 33. In this example, the marker 31 is sequentially statically displayed in the order of the position close to the upper left corner and the position close to the lower right corner. Instead of the two corners described above, the marker 31 may be displayed at two corners on the other diagonal line, i.e., the positions close to the upper right corner and the lower left corner. The marker 31 may be displayed in reverse order.

By acquiring the line of sight information in the two corners on one diagonal line of the visual field 33, the line of sight information in the two corners on the other diagonal line can be estimated as described above. Additionally, since the center position is the substantially midpoint between the two corners on the diagonal line, the line of sight information at the center position of the visual field 33 can also be estimated by obtaining an average of the line of sight information in the two corners, for example. Therefore, the display positions of the marker 31 can be minimized to further shorten the adjustment time in this example by displaying the marker 31 only at the two corners on one diagonal line.

(5-4. Display of Moving Marker)

In the example shown in FIG. 7, the displayed marker 31 continuously moves through a preset route instead of the static display as shown in FIGS. 4 to 6. In this example, the displayed marker 31 continuously moves though a route 35 including the display positions shown in FIG. 4, i.e., five positions at the center position and close to the four corners of the visual field 33, in the order of the center position, the position close to the upper left corner, the position close to the lower left corner, the position close to the upper right corner, and the position close to the lower right corner.

The user moves the line of sight to follow and gaze at the moving marker 31. The sight line detector 9 detects the line of sight information at least when the marker 31 passes through reference positions, i.e., at least when the marker 31 passes through the five positions at the center position and the four corners in this example. In addition to these five positions, the line of sight information may also be detected at the midpoints thereof.

The movement route of the marker 31 is not limited to the above example and may be any route at least including two corners on a diagonal line. The order of movement of the marker 31 is not limited to the above example and may be changed.

(5-5. Display of Frame Surrounding Display Area of Marker)

In the example shown in FIG. 8, a frame 37 surrounding a display area of the marker 31 is displayed along with the marker 31 in the visual field 33. Since the marker 31 is displayed at the display positions shown in FIG. 4, i.e., the five positions at the center positions and close to the four corners of the visual field 33 in this example, the substantially rectangular frame 37 is displayed to surround these five display positions. The frame 37 is not limited to this shape and may have, for example, an elliptical shape or a polygonal shape other than a rectangle in accordance with the display positions of the marker 31. As is the case with the marker 31, the display control part 15 displays the frame 37 such that the frame 37 stands still at a preset position in the visual field 33 regardless of the movement and position of the user's head. As a result, even in the case that the user moves the head during adjustment of the line of sight detection, the frame 37 is displayed along with the marker 31 at the set position without being affected by the movement and the line of sight detection can properly be adjusted.

<6. Process Procedures Related to Drawing Control Based on Line of Sight>

An example of process procedures related to drawing control based on the line of sight performed by the CPU 101 of the information processing device 3 will be described with reference to FIG. 9. Processes shown in FIG. 9 are executed during, for example, the display or reproduction of contents or the activation of a game by the information processing device 3 after completion of the adjustment of the line of sight detection described above.

At step S105, the information processing device 3 acquires the user's line of sight information detected by the sight line detector 9.

At step S110, the information processing device 3 uses the identification part 19 to identify the gaze point based on the line of sight information acquired at step S105. The gaze point is identified with a technique as described above and the identification part 19 refers to the correlation information read from the recording device 117 to identify the user's gaze point corresponding to the line of sight information acquired at step S105.

At step S115, the information processing device 3 switches a model located in a vicinity region of the gaze point to a model with highest image quality (a high model described later) out of the corresponding models stored in the storage part 27 based on the gaze point identified by the drawing control part 25 at step S110.

At step S120, the information processing device 3 switches a model located in a peripheral region of the gaze point to a model with lower image quality (a low model or a middle model described later) as compared to the model located in the vicinity region based on the gaze point identified by the drawing control part 25 at step S110.

At step S125, the information processing device 3 determines whether the user inputs a termination instruction (e.g., a termination instruction for the display or reproduction of contents or a termination instruction for a game) by using the input device 113 etc. In the case that the termination instruction is not input (step S125:NO), the information processing device 3 returns to step S105 to repeat the acquisition of the line of sight information, the identification of the gaze position, the switching of models, etc. In the case that the termination instruction is input (step S125:YES), this flow is terminated.

The process procedures described above are an example and may at least partially be deleted or modified, or other procedures may be added. For example, step S115 and step S120 may be performed in reverse order.

<7. Form of Drawing Control Based on Line of Sight>

A form of the drawing control based on the line of sight described above will be described with reference to FIGS. 10 to 13.

(7-1. Switching of Two Types of Models)

An example shown in FIGS. 10 and 11 is the case of switching two types of models drawn at different levels of image quality. As shown in FIG. 10, this example includes five person models M1-M5 displayed in the visual field 33. The type, the number, the positions etc. of the models are not limited thereto. The images (such as background) other than the models are not shown.

As shown in FIG. 11, the storage part 27 stores for each type of the models M1-M5 a high model with relatively higher image quality and a low model with relatively lower image quality. In this example, the high model is set to have a relatively larger polygon count, a relatively higher texture resolution, a relatively larger degree of shader effect. The low model is set to have a relatively smaller polygon count, a relatively lower texture resolution, a relatively lower degree of shader effect.

Polygons are polygonal elements used for representing a three-dimensional shape mainly in three-dimensional computer graphics and a larger polygonal count enables finer and more elaborate drawing. Texture means an image applied for representing a quality (e.g., gloss and unevenness) of a surface of an object mainly in three-dimensional computer graphics and a higher texture resolution enables finer and more elaborate drawing. A shader is a function of shadow processing etc. mainly in three-dimensional computer graphics and a larger degree of shader effect enables finer and more elaborate drawing. The shader function may be implemented by hardware or software (so-called programmable shader).

In the example shown in FIG. 11, these factors related to image quality are compositely changed in stages in the models, models may be prepared such that each of the factors is independently changed in stages. The factors related to image quality are not limited to the above example and may include other factors such as a LOD (level of detail), for example.

As shown in FIG. 10, a vicinity region 41 is set in the vicinity of the gaze point 39 of the user. In this example, the vicinity region 41 is set as a circular region having a predetermined radius around the gaze point 39 in the two-dimensional coordinate system in the visual field 33. In general, since the optical characteristics of the eyes of the user degrade as a distance from the center position of the retina increases, a change in image quality is more hardly recognized by the user in a region more distant from the gaze point 39 in the visual field 33. The radius of the vicinity region 41 is set in consideration of this fact, and a change in image quality is easily recognized by the user on the inside of the vicinity region 41, while a change in image quality is hardly recognized by the user on the region outside the vicinity region 41, i.e., in a peripheral region 43 on the periphery of the gaze point 39.

FIG. 10 shows an example of the user's gaze point 39 moving from a substantially center position to the substantially lower left in the visual field 33. As shown in an upper portion of FIG. 10, when the gaze point 39 is at the substantially center position, a model M1 located in the vicinity region 41 is displayed as the high model with the highest image quality out of the corresponding models M1 stored in the storage part 27. Models M2-M5 located in the peripheral region 43 are displayed as the low models with lower image quality as compared to the model M1 located in the vicinity region 41. As a result, the drawing of the peripheral region 43 is simplified as compared to the drawing of the vicinity region 41.

As shown in a lower portion of FIG. 10, when the gaze point 39 has moved, the model M3 consequently located in the vicinity region 41 is switched and displayed as the high model with the highest image quality out of the corresponding models M3 stored in the storage part 27. The model M1 consequently located in the peripheral region 43 is switched and displayed as the low model with lower image quality as compared to the model M3 located in the vicinity region 41. The models M2, M4, M5 are located in the peripheral region 43 without change before and after the movement of the gaze point 39 and are kept displayed as the low models. As a result, the drawing of the peripheral region 43 of the gaze point 39 is simplified as compared to the drawing of the vicinity region 41.

Even when the drawing is simplified as described above, the models are not blurry displayed. Since the polygon count is decreased and the quality of object surfaces and the accuracy of the shadow processing are lowered, the models are more roughly drawn while outlines such as contours remain sharp, for example.

The models located in the vicinity region 41 may be limited to those entirely located inside the vicinity region 41 or may include those partially located inside the vicinity region 41. In the latter case, a proportion may be set such that, for example, a model is considered located inside when more than half of the model is located inside the vicinity region 41.

(7-2. Switching of Three or More Types of Models)

Although two types of models with different image qualities are switched in the above description, three or more types of models may be switched. An example shown in FIGS. 12 and 13 is the case of switching three types of models drawn at different levels of image quality. As shown in FIG. 12, this example includes the five person models M1-M5 displayed in the visual field 33.

As shown in FIG. 13, the storage part 27 stores for each of the models M1-M5 a high model with highest image quality and a low model with lowest image quality as well as a middle model with intermediate image quality. The middle model has the factors of the polygon count, the texture resolution, and the shader effect all set to middle levels between the high model and the low model.

As shown in FIG. 12, the vicinity region 41 is set in the vicinity of the gaze point 39 of the user. Additionally, in this example, a peripheral region set as the region outside the vicinity region 41 is divided into a first peripheral region 45 relatively close to the gaze point 39 and a second peripheral region 47 more distant from the gaze point 39 as compared to the first peripheral region 45. Since a change in image quality is more hardly recognized by the user in a region more distant from the gaze point 39 due to the optical characteristics of the eyes, a change in image quality is more hardly recognized by the user in second peripheral region 47 than the first peripheral region 45.

FIG. 12 shows an example of the user's gaze point 39 moving from the substantially center position to the substantially lower left in the visual field 33. As shown in an upper portion of FIG. 12, when the gaze point 39 is at the substantially center position, the model M1 located in the vicinity region 41 is displayed as the high model with the highest image quality out of the corresponding models M1 stored in the storage part 27. The models M3, M5 located in the first peripheral region 45 are displayed as the middle models with lower image quality as compared to the model M1 located in the vicinity region 41. The models M2, M4 located in the second peripheral region 47 are displayed as the low models with further lower image quality even as compared to the models M3, M5 located in the first peripheral region 45.

As shown in a lower portion of FIG. 12, when the gaze point 39 has moved, the model M3 consequently located in the vicinity region 41 is switched and displayed as the high model with the highest image quality out of the corresponding models M3 stored in the storage part 27. The model M1 consequently located in the first peripheral region 45 is switched and displayed as the middle model with lower image quality as compared to the model M3 located in the vicinity region 41. The model M2 changed from the second peripheral region 47 to the first peripheral region 45 is switched from the low model to the middle model, while the model M5 changed from the first peripheral region 45 to the second peripheral region 47 is switched from the middle model to the low model. The model M4 is located in the second peripheral region 47 without change before and after the movement of the gaze point 39 and is kept displayed as the low model.

As described above, since the peripheral region is further divided into two in accordance with a distance from the gaze point 39 and each model has models prepared at different levels of image quality in accordance with the number of regions in this example, the drawing control can be more finely performed. Although the peripheral region is divided into two in the above description, the peripheral region may further finely be divided and each model may have models prepared at more different levels of image quality.

<8. Hardware Configuration Example of the Information Processing Device>

A hardware configuration example will be described for the information processing device 3 achieving the processing parts implemented by a program executed by the CPU 101 described above, with reference to FIG. 14.

As shown in FIG. 14, the information processing device 3 has, for example, a CPU 101, a ROM 103, a RAM 105, a dedicated integrated circuit 107 constructed for specific use such as an ASIC or an FPGA, an input device 113, an output device 115, a recording device 117, a drive 119, a connection port 121, and a communication device 123. These constituent elements are mutually connected via a bus 109 and an input/output (I/O) interface 111 such that signals can be transferred.

The program can be recorded in a recording device such as the ROM 103, the RAM 105, and the recording device 117, for example.

The program can also temporarily or permanently be recorded in a removable recording medium 125 such as various optical disks including CDs, MO disks, and DVDs, and semiconductor memories. The removable recording medium 125 as described above can be provided as so-called packaged software. In this case, the program recorded in the removable recording medium 125 may be read by the drive 119 and recorded in the recording device 117 through the I/O interface 111, the bus 109, etc.

The program may be recorded in, for example, a download site, another computer, or another recording medium (not shown). In this case, the program is transferred through a network NW such as a LAN and the Internet and the communication device 123 receives this program. The program received by the communication device 123 may be recorded in the recording device 117 through the I/O interface 111, the bus 109, etc.

The program may be recorded in appropriate external connection equipment 127, for example. In this case, the program may be transferred through the appropriate connection port 121 and recorded in the recording device 117 through the I/O interface 111, the bus 109, etc.

The CPU 101 executes various process in accordance with the program recorded in the recording device 117 to implement the processes of the display control part 15, the drawing control part 25, etc. In this case, the CPU 101 may directly read and execute the program from the recording device 117 or may be execute the program once loaded in the RAM 105. In the case that the CPU 101 receives the program through, for example, the communication device 123, the drive 119, or the connection port 121, the CPU 101 may directly execute the received program without recording in the recording device 117.

The CPU 101 may execute various processes based on a signal or information input from the input device 113 such as a mouse, a keyboard, a microphone, and a game operating device (not shown) as needed.

The CPU 101 may output a result of execution of the process from the output device 115 such as a display device and a sound output device, for example, and the CPU 101 may transmit this process result to the communication device 123 or the connection port 121 as needed or may record the process result into the recording device 117 or the removable recording medium 125.

<9. Effects of Embodiment>

As described above, the program of this embodiment causes the information processing device 3 communicably connected to the head mounted display 5 to act as the drawing control part 25. Based on the user's line of sight information detected by the sight line detector 9, the drawing control part 25 controls drawing of an image such that the drawing is simplified in the peripheral region 43 etc. (including the peripheral regions 45, 47. the same hereinafter.) of the user's gaze point 39 as compared to the vicinity region 41 of the gaze point 39. Since the drawing is controlled in accordance with the direction of the user's line of sight, the simplified drawing of the peripheral region 43 etc. is hardly recognized by the user regardless of the direction of the line of sight. Because of the simplified drawing of the peripheral region 43 etc., the vicinity region 41 of the gaze point 39 can accordingly be drawn with higher image quality without increasing a processing load of the CPU 101 etc. Therefore, the image quality recognized by the user can be improved regardless of the direction of the gaze direction.

The program of this embodiment further causes the information processing device 3 to act as the storage part 27. The storage part 27 stores for each model M a plurality of models drawn at different levels of image quality. The drawing control part 25 switches the model M located in the peripheral region 43 etc. of the gaze point 39 to the model with the lower image quality as compared to the model M located in the vicinity region 41 of the gaze point 39.

Since the drawing is controlled for each model, an increase in the processing load of the CPU 101 etc. can be suppressed as compared to the case of controlling the drawing of the entire region including a background and, since the model tending to attract user's attention in the visual field 33 is subjected to the drawing control, the apparent image quality recognized by the user can effectively be improved.

In this embodiment, the drawing control part 25 switches the model M located in the vicinity region 41 to the model with the highest image quality out of the corresponding models M stored in the storage part 27. As a result, the image quality can be maximized in the easily recognized vicinity region 41 while lowering the image quality of the peripheral region 43 etc. hardly recognized by the user and, therefore, performance of the CPU 101 etc. related to the image can be optimized.

In this embodiment, the storage part 27 stores for each model M a plurality of models having different levels of polygon count. The drawing control part 25 switches the model M located in the peripheral region 43 etc. to the model having the smaller polygon count as compared to the model M located in the vicinity region 41.

As a result, an image can be drawn with higher quality with a relatively larger polygon count in the easily recognized vicinity region 41 while simplifying the drawing with a relatively smaller polygon count in the peripheral region 43 etc. hardly recognized by the user and, therefore, the image quality recognized by the user can further be improved regardless of the gaze direction.

In this embodiment, the storage part 27 stores for each model M a plurality of models having different levels of texture resolution. The drawing control part 25 switches the model M located in the peripheral region 43 etc. to the model having the lower texture resolution as compared to the model M located in the vicinity region 41.

As a result, an image can be drawn with higher quality with a relatively higher texture resolution in the easily recognized vicinity region 41 while simplifying the drawing with a relatively lower texture resolution in the peripheral region 43 etc. hardly recognized by the user and, therefore, the image quality recognized by the user can be improved regardless of the gaze direction.

In this embodiment, the storage part 27 stores for each model M a plurality of models having different degrees of shader effect. The drawing control part 25 switches the model M located in the peripheral region 43 etc. to the model having the smaller degree of shader effect as compared to the model M located in the vicinity region 41.

As a result, an image can be drawn with higher quality at a relatively larger degree of shader effect in the easily recognized vicinity region 41 while simplifying the drawing at a relatively smaller degree of shader effect in the peripheral region 43 hardly recognized by the user and, therefore, the image quality recognized by the user can be improved regardless of the gaze direction.

The techniques of the embodiment and modification examples may appropriately be utilized in combination other than those described above.

Although not exemplarily illustrated one by one, the embodiment and modification examples are implemented with other various modifications without departing from the spirit thereof.

What is claimed is:

1. An image processing method executed by an information processing device communicably connected to a head mounted display comprising a display device configured to display an image and a sight line detector configured to detect a user's line of sight, the image processing method comprising:
   controlling drawing of the image such that the drawing is simplified in a peripheral region of a gaze point of the user as compared to a vicinity region that is nearer to the gaze point than the peripheral region, based on detected line of sight information of the user's line of sight detected by the sight line detector, wherein the gaze point is determined using correlation information of the user to identify the gaze point corresponding to the detected line of sight information, the correlation information relates actual display positions to stored line of sight information of the user, wherein the vicinity region encompasses an entire area of the image within a first radial distance from the gaze point, and wherein the peripheral region encompasses an entire area of the image outside of the vicinity region and within a second radial distance from the gaze point, the second radial distance being greater than the first radial distance.

2. The image processing method according to claim 1, further comprising:

storing a plurality of models drawn at different levels of image quality for each type of the model, wherein the controlling drawing of the image comprises switching the model located in the peripheral region to the model with lower image quality as compared to the model located in the vicinity region.

3. The image processing method according to claim 2, wherein the controlling drawing of the image comprises switching the model located in the vicinity region to the model with highest image quality out of corresponding type of the models stored.

4. The image processing method according to claim 2, wherein the storing a plurality of models comprises storing a plurality of models having different levels of polygon count for each type of the model, wherein the controlling drawing of the image comprises switching the model located in the peripheral region to the model having smaller polygon count as compared to the model located in the vicinity region.

5. The image processing method according to claim 2, wherein the storing a plurality of models comprises storing a plurality of models having different levels of texture resolution for each type of the model, wherein the controlling drawing of the image comprises switching the model located in the peripheral region to the model having lower texture resolution as compared to the model located in the vicinity region.

6. The image processing method according to claim 2, wherein the storing a plurality of models comprises storing a plurality of models having different degrees of shader effect for each type of the model, wherein the controlling drawing of the image comprises switching the model located in the peripheral region to the model having smaller degree of shader effect as compared to the model located in the vicinity region.

7. The image processing method according to claim 1, wherein the correlation information is determined by displaying a series of markers on the display at predetermined respective display positions, detecting the user's line of sight using the sight line detector for each marker of the series of markers displayed on the display, and correlating the predetermined respective display positions to the user's line of sight detected by the sight line detector at each of the predetermined respective display positions.

8. The image processing method according to claim 1, wherein the controlling of the drawing of the image further includes simplifying the drawing in an additional peripheral region of the gaze point of the user as compared to the peripheral region that is nearer to the gaze point than the additional peripheral region.

9. The image processing method according to claim 8, wherein the additional peripheral region encompasses an entire area of the image outside of the peripheral region.

10. A non-transitory recording medium readable by an information processing device communicably connected to a head mounted display comprising a display device configured to display an image and a sight line detector configured to detect a user's line of sight, the recording medium storing a program causing the information processing device to function as:

a drawing control part that controls drawing of the image such that the drawing is simplified in a peripheral region of a gaze point of the user as compared to a vicinity region that is nearer to the gaze point than the peripheral region, based on detected line of sight information of the user's line of sight detected by the sight line detector, wherein the gaze point is determined using correlation information of the user to identify the gaze point corresponding to the detected line of sight information, the correlation information relates actual display positions to stored line of sight information of the user, wherein the vicinity region encompasses an entire area of the image within a first radial distance from the gaze point, and wherein the peripheral region encompasses an entire area of the image outside of the vicinity region and within a second radial distance from the gaze point, the second radial distance being greater than the first radial distance.

11. The recording medium according to claim 10, the program further causing the information processing device to function as:

a storage part that stores a plurality of models drawn at different levels of image quality for each type of the model, wherein the drawing control part switches the model located in the peripheral region to the model with lower image quality as compared to the model located in the vicinity region.

12. The recording medium according to claim 11, wherein the drawing control part switches the model located in the vicinity region to the model with highest image quality out of corresponding type of the models stored in the storage part.

13. The recording medium according to claim 11, wherein the storage part stores a plurality of models having different levels of polygon count for each type of the model, wherein the drawing control part switches the model located in the peripheral region to the model having smaller polygon count as compared to the model located in the vicinity region.

14. The recording medium according to claim 11, wherein the storage part stores a plurality of models having different levels of texture resolution for each type of the model, wherein the drawing control part switches the model located in the peripheral region to the model having lower texture resolution as compared to the model located in the vicinity region.

15. The recording medium according to claim 11,
wherein the storage part stores a plurality of models having different degrees of shader effect for each type of the model,
wherein the drawing control part switches the model located in the peripheral region to the model having smaller degree of shader effect as compared to the model located in the vicinity region.

16. The recording medium according to claim 10,
wherein the correlation information is determined by displaying a series of markers on the display at predetermined respective display positions, detecting the user's line of sight using the sight line detector for each marker of the series of markers displayed on the display, and correlating the predetermined respective display positions to the user's line of sight detected by the sight line detector at each of the predetermined respective display positions.

17. The recording medium according to claim 10,
wherein the drawing control part control the drawing of the image such that the drawing is simplified in an additional peripheral region of the gaze point of the user as compared to the peripheral region that is nearer to the gaze point than the additional peripheral region.

18. The recording medium according to claim 17,
wherein the additional peripheral region encompasses an entire area of the image outside of the peripheral region.

\* \* \* \* \*